Oct. 27, 1964  E. I. COULON ETAL  3,153,963
APPARATUS FOR SHEARING THE ENDS OF TUBING
Filed June 25, 1963
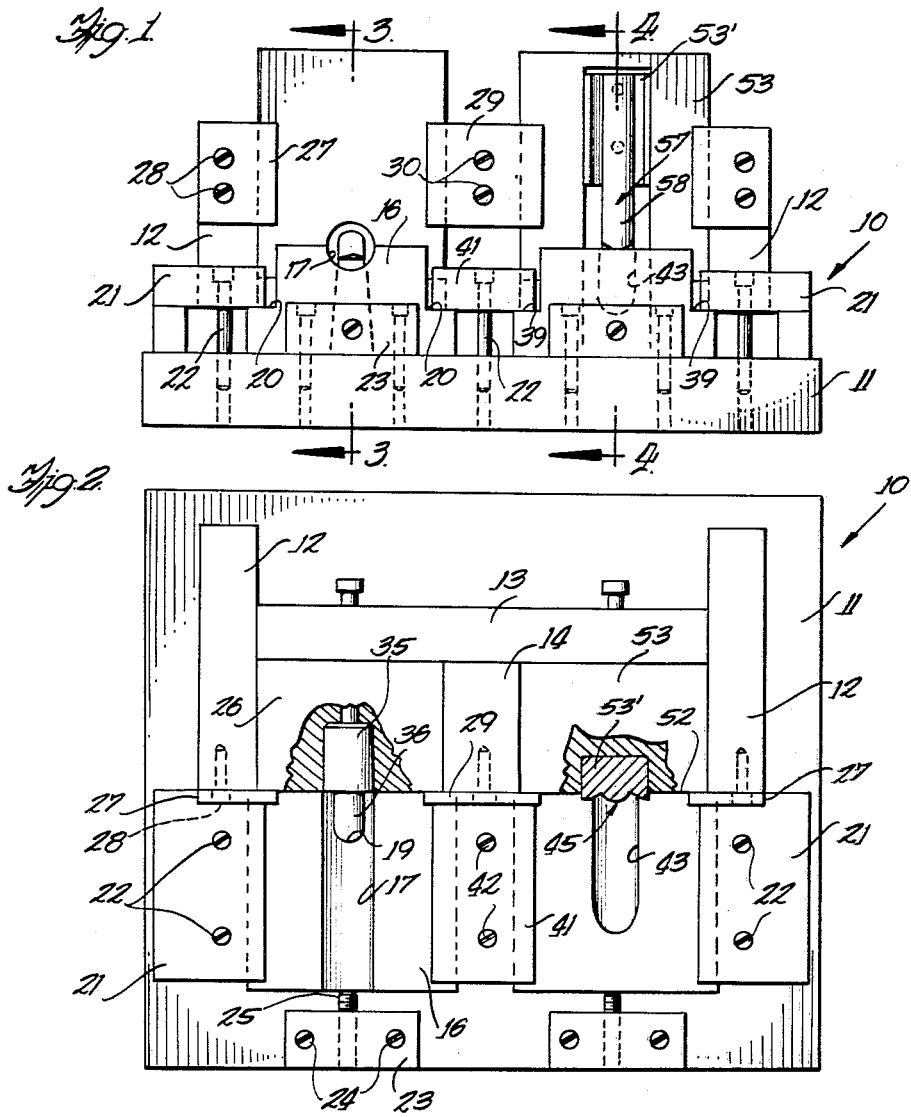
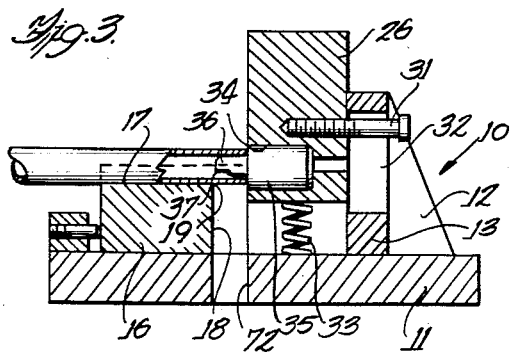

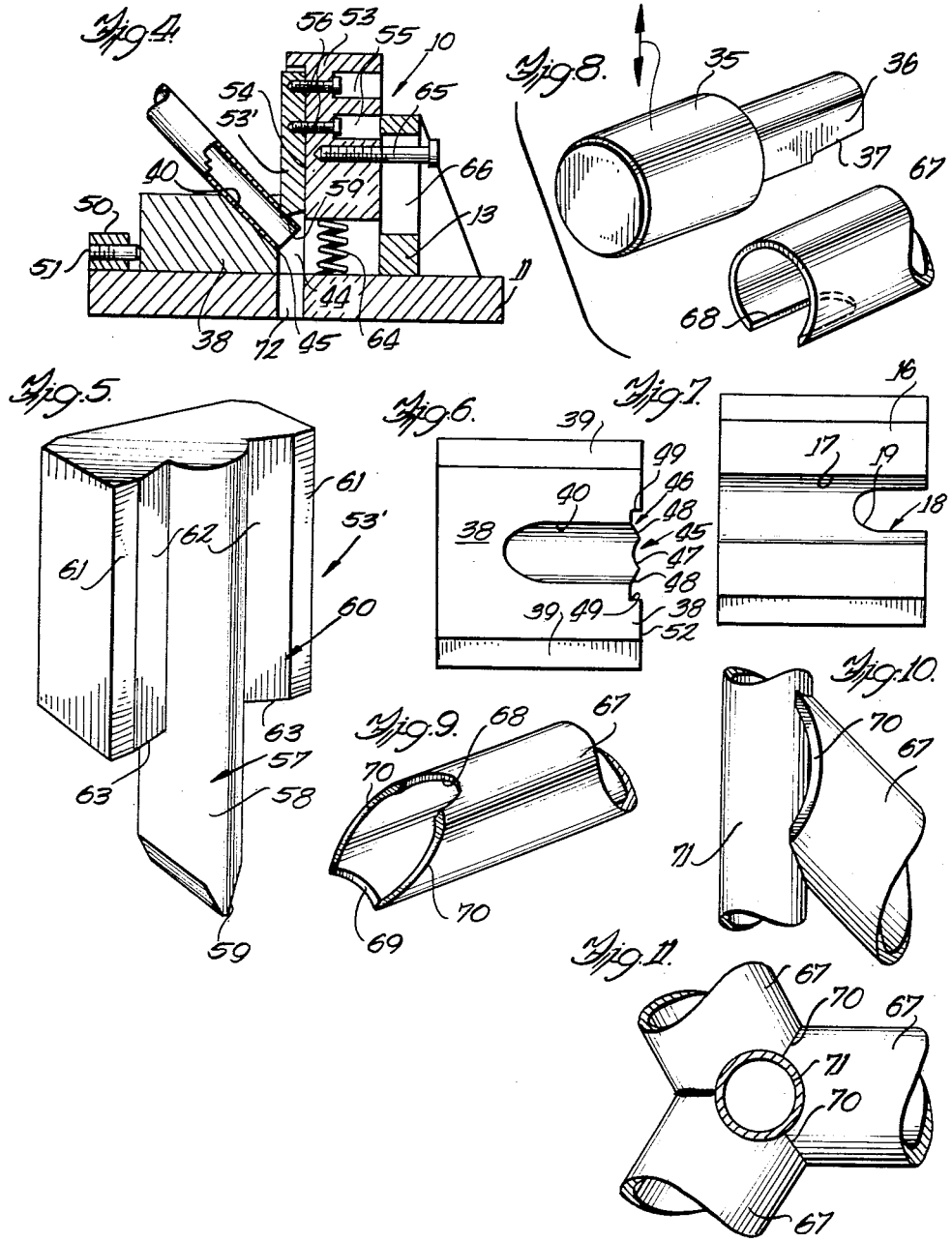

United States Patent Office 3,153,963
Patented Oct. 27, 1964

3,153,963
APPARATUS FOR SHEARING THE ENDS
OF TUBING
Edward I. Coulon, Chicago, and Harry J. May, Lombard, Ill., assignors to Vogel Tool & Die Corporation, Melrose Park, Ill., a corporation of Illinois
Filed June 25, 1963, Ser. No. 290,506
6 Claims. (Cl. 83—191)

This invention relates to an apparatus for shearing the ends of tubing in the preparation of tubular assemblies. More specifically, the invention relates to an improvement wherein a tube end is prepared by shearing wherein a plurality of tubes may have their ends joined and connected to another tube.

It is a prime object of this invention to provide an improved apparatus for shearing the ends of tubing in the preparation of tubular assemblies.

Another object is to provide an improved apparatus for shearing the ends of a tube wherein the tube end is provided with opposed notches and opposed flat faces which will facilitate the welding of the parts in the preparation of a tubular assembly.

A still further object is the provision of an improved punch and die apparatus which will notch and shear the end of the tube in a two-step operation wherein the tube end is particularly adapted for the joining of a plurality of tubes around the perimeter of another tube.

These and further objects will become more readily apparent from a reading of the description when examined in connection with the accompanying sheets of drawings.

In the drawing:

FIGURE 1 is a front elevational view of an apparatus for shearing the ends of tubing;

FIGURE 2 is a plan view of the apparatus shown in FIGURE 1 with certain portions broken away to illustrate a punch and die arrangement;

FIGURE 3 is a cross sectional view taken along the line 3—3 of FIGURE 1;

FIGURE 4 is a cross sectional view taken along the line 4—4 of FIGURE 1;

FIGURE 5 is a perspective view of an improved punch;

FIGURE 6 is a detail plan view of an improved die for shearing the end of the tube;

FIGURE 7 is a detail plan view of a die for initially cooperating to shear an opening in a tube;

FIGURE 8 is a perspective view of a punch and showing a tube end after an initial slotting operation;

FIGURE 9 is a perspective detail view of a tube end after it has been sheared by an apparatus for shearing the ends of tubing;

FIGURE 10 is a side elevational view showing the small diameter tube and a larger tube ready to be connected thereto in the formation of a tubular assembly; and FIGURE 11 is a plan view showing a completed tubular assembly having tube ends ready for connection after having been sheared by an improved apparatus.

Referring now generally to FIGURES 1 and 2, an apparatus for shearing the ends of tubing is generally designated by the reference character 10. The apparatus 10 comprises a base 11 having suitably connected thereto upright housing members 12 in turn connected by a vertically extending back wall 13. The housing members 12 are separated by a substantially centrally located upright middle wall 14 also suitably connected to the base 11.

A die is generally designated at 16 as best shown in FIGURES 1, 2, 3 and 7. The die 16 comprises a groove 17 extending generally horizontal and being substantially of the configuration to receive a tubular member. The groove 17 is joined by a vertical groove 18 forming a cutting edge designated at 19 as best shown in FIGURES 2 and 3. The die 16 also is provided with oppositely positioned shoulders 20, one of which is engaged by an L-shaped securing block 21 rigidly connected to the base 11 by means of screws 22. A thrust block 23 is suitably supported on the base 11 by means of screws 24 and a set screw 25 is tightened against the die 16 to rigidly secure the same.

A punch is designated at 26, the said punch being adapted to vertically reciprocate between one of the housing members 12 and the middle wall 14. The punch 26 is secured in position by means of a supporting plate 27 having screws 28 threaded into one of the sidewalls 12. A central support plate 29 also engages the punch 26 to secure the same in position and screws 30 are suitably threaded into the middle wall 14 to secure the plate 29 thereto. As best shown in FIGURE 3, a screw stop 31 is threaded into the punch 26 and is adapted to move within a slot 32 provided in the rear wall 13. A spring 33 normally urges the punch 26 to the position shown in FIGURE 3. The punch 26 is further provided with a horizontally extending bore 34 having secured therein a shank 35 which is provided, as shown in FIGURE 8, with a projecting punch element 36 having a two-step cutting edge 37. The punch shank 35 is suitably connected within the bore 34 to be rigidly retained therein.

Referring now to FIGURES 1, 2 and 4, another die is generally designated by the reference character 38. The die 38 also includes shoulders 39 and a diagonally or acute angularly extending groove 40. A centrally located securing block 41 is rigidly connected by means of screws 22 to the base 15 to engage the shoulders 20 and 39 to rigidly secure the said die 38 on the base 11. Another L-shaped securing block 21 including screws 22 is connected to one of the shoulders 39 of the die 38 for further securing the die in position.

As best shown in FIGURE 4, a groove 44 extending vertically joins the groove 40 and provides a cutting edge generally designated at 45. The cutting edge 45 is positioned within recess 46 and the die 38 is provided with a vertically extending arcuate portion designated at 47. The said arcuate portion 47 being of smaller dimension than the transverse dimension of the groove 40. A pair of vertically extending diverging portions 48, as best shown in FIGURE 6, extend from the arcuate groove 47 toward the end of the groove 40 and the recess 46 extends outwardly in opposed direction from the axis of the groove 40 and is provided with a pair of shoulders 49.

A thrust block 50 is suitably connected to the base 11 and includes a set screw 51 adapted to be tightened against the block 38 to secure the same in position. The die 38 includes a punch engaging face 52 which is adapted to engage a punch designated at 53.

As best shown in FIGURES 1 and 2 a punch block is designated at 53. The punch block is adapted to support a punch 53' which is supported in a recess 54 of the block 53. The block 53 is provided with bores 55 and a pair of screws 56 suitably connected to the punch 53' support the said punch 53' within the recess 54.

As best shown in FIGURES 1 and 5, the punch 53' is provided with an extension 57 having a front arcuate face 58. The lower end of the extension 57 is provided with a tapered piercing end 59. The punch 53' further includes a die engaging face 60 with the arcuate face 58 being coextensive with said face 60. A pair of flat shoulders 61 are positioned outwardly from the face 58 on opposite sides of the punch 53'. A pair of converging flat surfaces 62 extend from the flat shoulder 61 inwardly and merge with the arcuate face 58. The converging flat surfaces extend downwardly to provide on opposite sides of the extension 57 a pair of cutting edges designated at 63.

As best shown in FIGURE 2 the shape of the punch

53' conforms to the shape of the cutting edge 45 of the die 38.

A spring 64, as shown in FIGURE 4, urges the punch holder 53 upwardly and a stop screw 65 is connected to the punch holder 53, the said screw 65 being slidable in a slot 66.

Referring now to FIGURES 8 through 11, a tube is designated at 67 which, as shown in FIGURE 8, is initially provided with a slot 68. The tube 67, as shown in FIGURE 9, is also provided with an opposite second slot or notch 69 opposite the slot 68. After the shearing operation, the sides of the tube are provided with flat faces 70. As shown in FIGURE 11, the tubes 67 may be positioned with their faces 70 in contiguous relation disposed around a tube 71 ready for welding or brazing. The base 11 is also suitably provided with slug clearance openings designated at 72.

In the operation, the tube is initially placed, as shown in FIGURE 3, in the groove 17 with the end of the tube disposed over the punch element 36. The apparatus 10 is placed in a suitable press which is adapted to force downwardly the punch 26 and the punch block 53. As the punch block 26 is now forced downwardly, the cutting edge 37 provides the initial slot 68 in the tube 67. The tube 67 is now moved into the position shown in FIGURE 4 wherein it assumes the angled position indicated. The punch holder 53 is now moved downwardly whereupon the extension 57 moves into the opening 68 and the piercing edge 59 pierces the lower end of the tube due to its cooperation with the cutting edge 25 to provide the slot indicated at 69. As the punch 53' is moved downwardly further, the cutting edges 63 cooperate with the cutting edge 45 to shear the sides of the tube and in so shearing, by virtue of the shape of the cutting edges 45 and 63, the flat edges 70 are provided on the sides of the tube. These edges 70 extend diagonally or in a plane at an angle with respect to the plane of the axis of the tube, the said latter plane intersecting both of the flat faces 70. Since these faces 70 are flat and are disposed in the manner shown in FIGURES 9 and 10, they will meet and be contiguous with adjacent faces 70 of two other tubes to be connected, as shown in FIGURE 11, wherein the three tubes 67 have adjacent contiguous faces 70 positioned for connection around a tube 71. Since the faces 70 are flat, it is now a simple matter to weld these contiguous faces 70 together, as shown in FIGURE 11, where two of such faces are welded.

Thus by virtue of the novel shape of the punch and die elements a tube may have its ends prepared so that it, with other tubes of similar fabrication, can be connected in the manner shown in FIGURE 11 in a close contiguous manner.

It is believed clear that the flat faces provide a close fit which is not otherwise obtainable with conventional punch and die arrangements. As the cutting edges 63 move downwardly they shear the sides of the tube so that the flat edges are obtained which in assembly greatly facilitate the welding procedure and provide for a stronger and more attractive connection.

Thus it is believed that the objects of the invention have been fully achieved and that modifications and changes may be made which do not depart from the spirit of the invention as disclosed or from the scope thereof as defined in the appended claims.

What is claimed is:

1. Apparatus for preparing the end of a tubular member comprising,
   (a) a first die member having a generally horizontally extending arcuate groove adapted to receive and support a tubular member,
   (b) a second vertically extending arcuate groove on said die providing with said first groove a first arcuate cutting edge,
   (c) a first punch positioned for relative movement with respect to said die, said punch having a second cutting edge conforming generally to the shape of said second groove,
   (d) said first punch being positioned interiorly of said tubular member and being movable to punch an elongated slot in the end of said tubular member,
   (e) a second die having a third arcuate groove disposed angularly with respect to said first groove supporting said tubular member,
   (f) a punch engaging face on said second die, said punch engaging face having a recess,
   (g) a third cutting edge disposed within said recess on said second die,
   (h) said third cutting edge including a vertical fourth groove on said punch engaging face,
   (i) said fourth groove being substantially smaller in transverse dimension than said second groove and being positioned relatively centrally with respect thereto and terminating at one end with said third groove,
   (j) said third cutting edge including a pair of flat vertical portions, said portions being disposed on opposite sides of said fourth groove and extending from said fourth groove in diverging diagonal relation to opposite ends of said third groove,
   (k) said recess having at opposite ends first shoulder portions,
   (l) a second punch positioned for relative movement with respect to said second die,
   (m) said second punch including a die engaging face having opposed second shoulder portions adapted to slide within said recess and engage and conform to said first shoulder portions,
   (n) a narrow punch element projecting downwardly from said second punch,
   (o) and having at its lower end an initial piercing edge,
   (p) said punch element having an arcuate forward face conforming to the shape of said fourth groove and being slidable therein,
   (q) said forward face extending upwardly between said second shoulders,
   (r) said die engaging face including a pair of inwardly converging flat vertical portions adapted to engage in sliding relation and conforming to the vertical diverging portions of said third cutting edge,
   (s) said inwardly converging portions having at their lower ends on opposite sides of said forward arcuate face a pair of fourth cutting edges adapted to conform to said third cutting edges,
   (t) and means for moving said second punch through the elongated slot of a tube whereby said piercing edge initially cuts an arcuate portion from the tube on the opposite side of said slot, and said third and fourth cutting edge cooperate to shear opposite sides of said tube wall to provide opposed flat edges extending in a plane angularly with respect to an axial plane through said tube which intersects both of said edges.

2. Apparatus for preparing the end of a tubular member comprising,
   (a) a first die member having a generally horizontally extending arcuate groove adapted to receive and support a tubular member,
   (b) a second vertically extending arcuate groove on said die providing with said first groove a first arcuate cutting edge,
   (c) a first punch positioned for relative movement with respect to said die, said punch having a second cutting edge conforming generally to the shape of said second groove,
   (d) said first punch being positioned interiorly of said tubular member and being movable to punch an elongated slot in the end of said tubular member,
   (e) a second die having a third arcuate groove disposed angularly with respect to said first groove supporting said tubular member, (f) a punch engaging face on said second die, said punch engaging face having a recess, (g) a third cutting edge disposed within said recess on said second die, (h) said third cutting edge including a vertical fourth groove on said punch engaging face, (i) said fourth groove being substantially smaller in transverse demension than said third groove and being positioned relatively centrally with respect thereto and terminating at one end with said third groove, (j) said third cutting edge including a pair of flat vertical portions, said portions being disposed on opposite sides of said fourth groove and extending from said fourth groove in diverging diagonal relation to opposite ends of said third groove, (k) said recess having at opposite ends first shoulder portions, (l) a second punch positioned for relative movement with respect to said second die, (m) said second punch including a die engaging face having opposed second shoulder portions adapted to slide within said recess and engage and conform to said first shoulder portions, (n) a narrow punch element projecting downwardly from said second punch and having at its lower end an initial piercing edge, (o) said punch element having an arcuate forward face conforming to the shape of said fourth groove and being slidable therein, (p) said forward face extending upwardly between said second shoulders, (q) said die engaging face including a pair of inwardly converging flat vertical portions adapted to engage in sliding relation and conforming to the vertical diverging portions of said third cutting edge, (r) said inwardly converging portions having at their lower ends on opposite sides of said forward arcuate face a pair of fourth cutting edges adapted to conform to said third cutting edges, (s) and means for moving said second punch through the elongated slot of a tube whereby said piercing edge initially cuts an arcuate portion from the tube on the opposite side of said slot, and said third and fourth cutting edge cooperate to shear opposite sides of said tube wall to provide opposed flat edges.

3. Apparatus for preparing the end of a tubular member comprising, (a) a first die member having a generally horizontally extending arcuate groove adapted to receive and support a tubular member.

(b) a second vertically extending arcuate groove on said die providing with said first groove a first arcuate cutting edge, (c) a first punch positioned for relative movement with respect to said die, said punch having a second cutting edge conforming generally to the shape of said second groove, (d) said first punch being movable to punch an elongated slot in the end of said tubular member, (e) a second die having a third arcuate groove disposed angularly with respect to said first groove supporting said tubular member, (f) a punch engaging face on said second die, said punch engaging face having a recess, (g) a third cutting edge disposed within said recess on said second die, (h) said third cutting edge including a vertical fourth groove on said punch engaging face, (i) said fourth groove being substantially smaller in transverse dimension than said third groove and being positioned relatively centrally with respect thereto and terminating at one end with said third groove, (j) said third cutting edge including a pair of flat vertical portions, said portions being disposed on opposite sides of said fourth groove and extending from said fourth groove in diverging diagonal relation to opposite ends of said third groove, (k) said recess having at opposite ends first shoulder portions, (l) a second punch positioned for relative movement with respect to said second die, (m) said second punch including a die engaging face having opposed second shoulder portions adapted to slide within said recess and engage and conform to said first shoulder portions.

(n) a narrow punch element projecting downwardly from said second punch and having at its lower end an initial piercing edge, (o) said punch element having an arcuated forward face conforming to the shape of said fourth groove and being slidable therein, (p) said forward face extending upwardly between said second shoulders, (q) said die engaging face including a pair of inwardly converging flat vertical portions adapted to engage in sliding relation and conforming to the vertical diverging portions of said third cutting edge, (r) said inwardly converging portions having at their lower ends on opposite sides of said forward arcuate face a pair of fourth cutting edges adapted to conform to said third cutting edges, (s) and means for moving said second punch through the elongated slot of a tube whereby said piercing edge initially cuts an arcuate portion from the tube on the opposite side of said slot, and said third and fourth cutting edges cooperate to shear opposite sides of said tube wall to provide opposed flat edges.

4. Apparatus for preparing the end of a tubular member comprising, (a) a first die member having a generally horizontally extending arcuate groove adapted to receive and support a tubular member.

(b) a second vertically extending arcuate groove on said die providing with said first groove a first arcuate cutting edge, (c) a first punch positioned for relative movement with respect to said die, said punch having a second cutting edge conforming generally to the shape of said second groove, (d) said first punch being movable to punch an elongated slot in the end of said tubular member, (e) a second die having a third arcuate groove disposed angularly with respect to said first groove supporting said tubular member, (f) a punch engaging face on said second die, said punch engaging face having a recess, (g) a third cutting edge disposed within said recess on said second die, (h) said third cutting edge including a vertical fourth groove on said punch engaging face, (i) said fourth groove being substantially smaller in transverse dimension than said third groove and being positioned relatively centrally with respect thereto and terminating at one end with said third groove, (j) said third cutting edge including a pair of flat vertical portions, said portions being disposed on opposite sides of said fourth groove and extending from said fourth groove in diverging diagonal relation to opposite ends of said third groove, (k) a second punch positioned for relative movement with respect to said second die, (l) said second punch including a die engaging face, (m) a narrow punch element projecting downwardly from said second punch and having at its lower end an initial piercing edge, (n) said punch element having an arcuate forward face conforming to the shape of said fourth groove and being slidable therein, (o) said forward face extending upwardly into said die engaging face, (p) said die engaging face including a pair of inwardly converging flat vertical portions adapted to engage in sliding relation and conforming to the vertical diverging portions of said third cutting edge, (q) said inwardly converging portions having at their lower ends on opposite sides of said forward arcuate face a pair of fourth cutting edges adapted to conform to said third cutting edges, (r) and means for moving said second punch through the elongated slot of a tube whereby said piercing edge initially cuts an arcuate portion from the tube on the opposite side of said slot, and said third and fourth cutting edges cooperate to shear opposite sides of said tube wall to provide opposed flat edges.

5. Apparatus for preparing the end of a tubular member comprising, (a) a first die member having a generally horizontally extending arcuate groove adapted to receive and support a tubular member, (b) a second vertically extending arcuate groove on said die providing with said first groove a first arcuate cutting edge, (c) a first punch positioned for relative movement with respect to said die, said punch having a second cutting edge conforming generally to the shape of said second groove, (d) said first punch being positioned interiorly of said tubular member and being movable to punch an elongated slot in the end of said tubular member, (e) a second die having a third arcuate groove disposed angularly with respect to said first groove supporting said tubular member, (f) a punch engaging face on said second die, said punch engaging face having a recess, (g) a third cutting edge disposed within said recess on said second die, (h) said third cutting edge including a vertical fourth groove on said punch engaging face, (i) said fourth groove being substantially smaller in transverse dimension than said third groove and being positioned relatively centrally with respect thereto and terminating at one end with said third groove, (j) said third cutting edge including a pair of flat vertical portions, said portions being disposed on opposite sides of said fourth groove and extending from said fourth groove in diverging diagonal relation to opposite ends of said third groove, (k) a second punch positioned for relative movement with respect to said second die, (l) said second punch including a die engaging face, (m) a narrow punch element projecting downwardly from said second punch and having at its lower end an initial piercing edge, (n) said punch element having an arcuate forward face conforming to the shape of said fourth groove and being slidable therein, (o) said forward face extending upwardly into said die engaging face, (p) said die engaging face including a pair of inwardly converging flat vertical portions adapted to engage in sliding relation and conforming to the vertical diverging portions of said third cutting edge, (q) said inwardly converging portions having at their lower ends on opposite sides of said forward arcuate face a pair of fourth cutting edges adapted to conform to said third cutting edges, (r) and means for moving said second punch through the elongated slot of a tube whereby said piercing edge initially cuts an arcuate portion from the tube on the opposite side of said slot, and said third and fourth cutting edges cooperate to shear opposite sides of said tube wall to provide opposed flat edges extending in a plane angularly with respect to an axial plane through said tube which intersects both of said edges.

6. Apparatus for preparing the end of a tubular member comprising, (a) a first die member having a generally horizontally extending arcuate groove adapted to receive and support a tubular member, (b) a second vertically extending arcuate groove on said die providing with said first groove a first arcuate cutting edge, (c) a first punch positioned for relative movement with respect to said die, said punch having a second cutting edge conforming generally to the shape of said second groove, (d) said first punch being movable to punch an elongated slot in the end of said tubular member, (e) a second die having a third arcuate groove disposed angularly with respect to said first groove supporting said tubular member, (f) a punch engaging face on said second die, said punch engaging face having a recess, (g) a third cutting edge disposed within said recess on said second die, (h) said third cutting edge including a vertical fourth groove on said punch engaging face, (i) said fourth groove being substantially smaller in transverse dimension than said third groove and being positioned relatively centrally with respect thereto and terminating at one end with said third groove, (j) said third cutting edge including a pair of flat vertical portions, said portions being disposed on opposite sides of said fourth groove and extending from said fourth groove in diverging diagonal relation to opposite ends of said third groove, (k) a second punch positioned for relative movement with respect to said second die, (l) said second punch including a die engaging face, (m) a narrow punch element projecting downwardly from said second punch and having at its lower end an initial piercing edge, (n) said punch element having an arcuate forward face conforming to the shape of said fourth groove and being slidable therein, (o) said forward face extending upwardly into said die engaging face, (p) said die engaging face including a pair of inwardly converging flat vertical portions adapted to engage in sliding relation and conforming to the vertical diverging portions of said third cutting edge, (q) said inwardly converging portions having at their lower ends on opposite sides of said forward arcuate face a pair of fourth cutting edges adapted to conform to said third cutting edges, (r) and means for moving said second punch through the elongated slot of a tube whereby said piercing edge initially cuts an arcuate portion from the tube on the opposite side of said slot, and said third and fourth cutting edge cooperate to shear opposite sides of said tube wall to provide opposed flat edges extending in a plane angularly with respect to an axial plane through said tube which intersects both of said edges.

References Cited by the Examiner

UNITED STATES PATENTS 3,073,195   1/63   Koster _____ 83—581

FOREIGN PATENTS 906,531   3/54   Germany.

LEON PEAR, *Primary Examiner.*